United States Patent
Gordon

[15] 3,696,881
[45] Oct. 10, 1972

[54] VEHICLE STEERING SYSTEM OF THE FLUID POWER TYPE AND SPRING CENTERED, SPRING MODULATED CONTROL CYLINDER THEREFOR

[72] Inventor: Richard O. Gordon, Belgium, Wis.
[73] Assignee: Harnischfeger Corporation, Milwaukee, Wis.
[22] Filed: June 16, 1971
[21] Appl. No.: 153,492

[52] U.S. Cl..................180/79.2 R, 60/52 S, 91/189, 180/79.2 C
[51] Int. Cl. ...............................................B62d 5/08
[58] Field of Search...180/79.2 RC; 60/52 S; 91/189, 91/413

[56] References Cited

UNITED STATES PATENTS

| | | |
|---|---|---|
| 2,567,074 | 9/1951 | Kupiec..............180/79.2 R X |
| 3,148,744 | 9/1964 | De Stasi................180/79.2 R |
| 3,532,178 | 10/1970 | Lindbom................180/79.2 C |
| 3,602,326 | 8/1971 | Garrison...............180/79.2 R |
| R25,981 | 3/1966 | Baudhuin..............180/79.2 R |

Primary Examiner—Benjamin Hersh
Assistant Examiner—Leslie J. Paperner
Attorney—James E. Nilles

[57] ABSTRACT

A vehicle steering system having a pair of fluid power cylinders for simultaneously actuating each wheel of a pair of steerable wheels, and also having a control cylinder for one of the power cylinders of each pair to cause said power cylinders to be actuated to different extents, consequently producing angular rotation of said steerable wheels in like directions, but in different amounts.

An improved spring centered and spring modulated control cylinder which is extended at a different rate than it is contracted.

8 Claims, 9 Drawing Figures

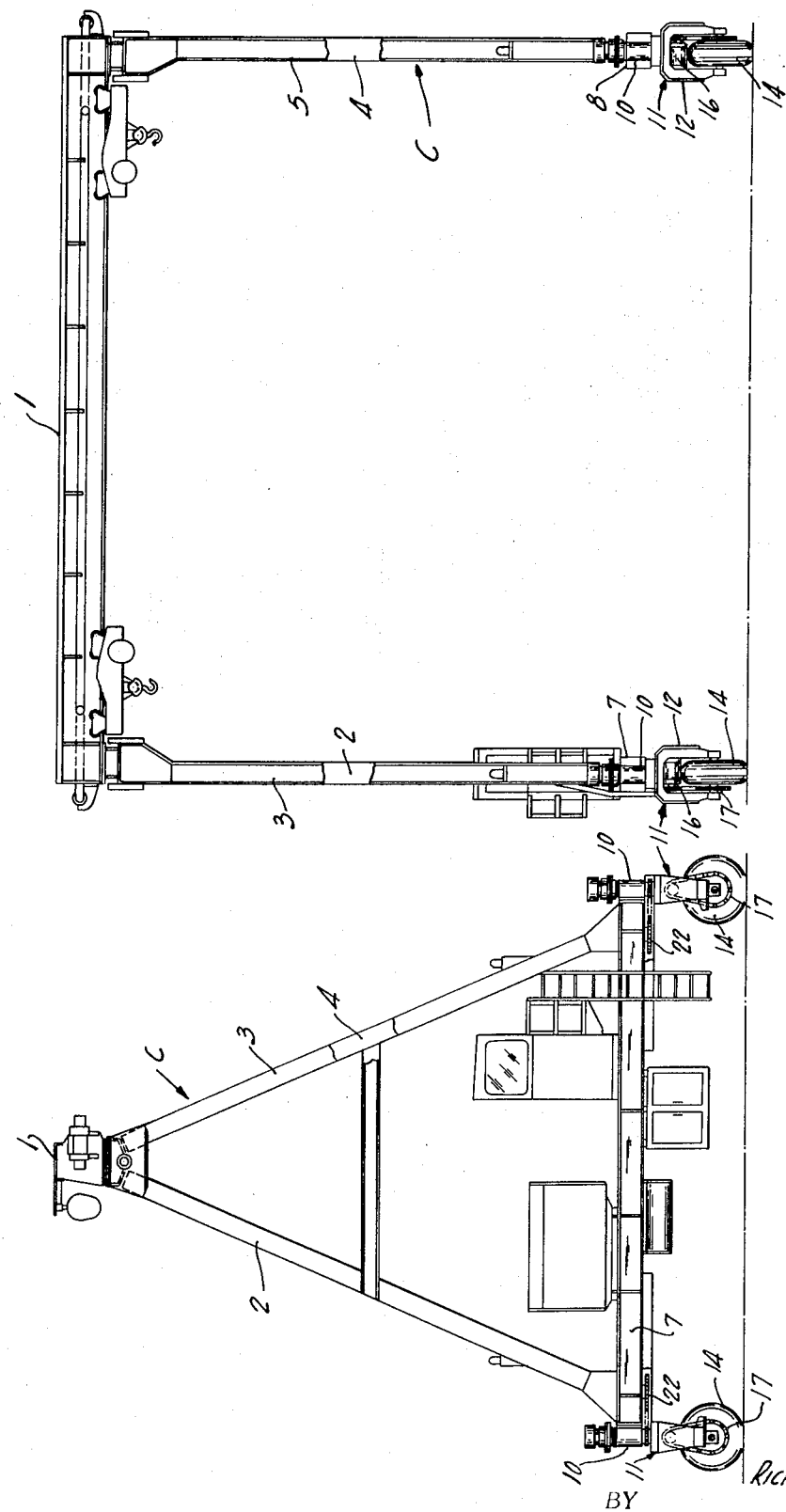

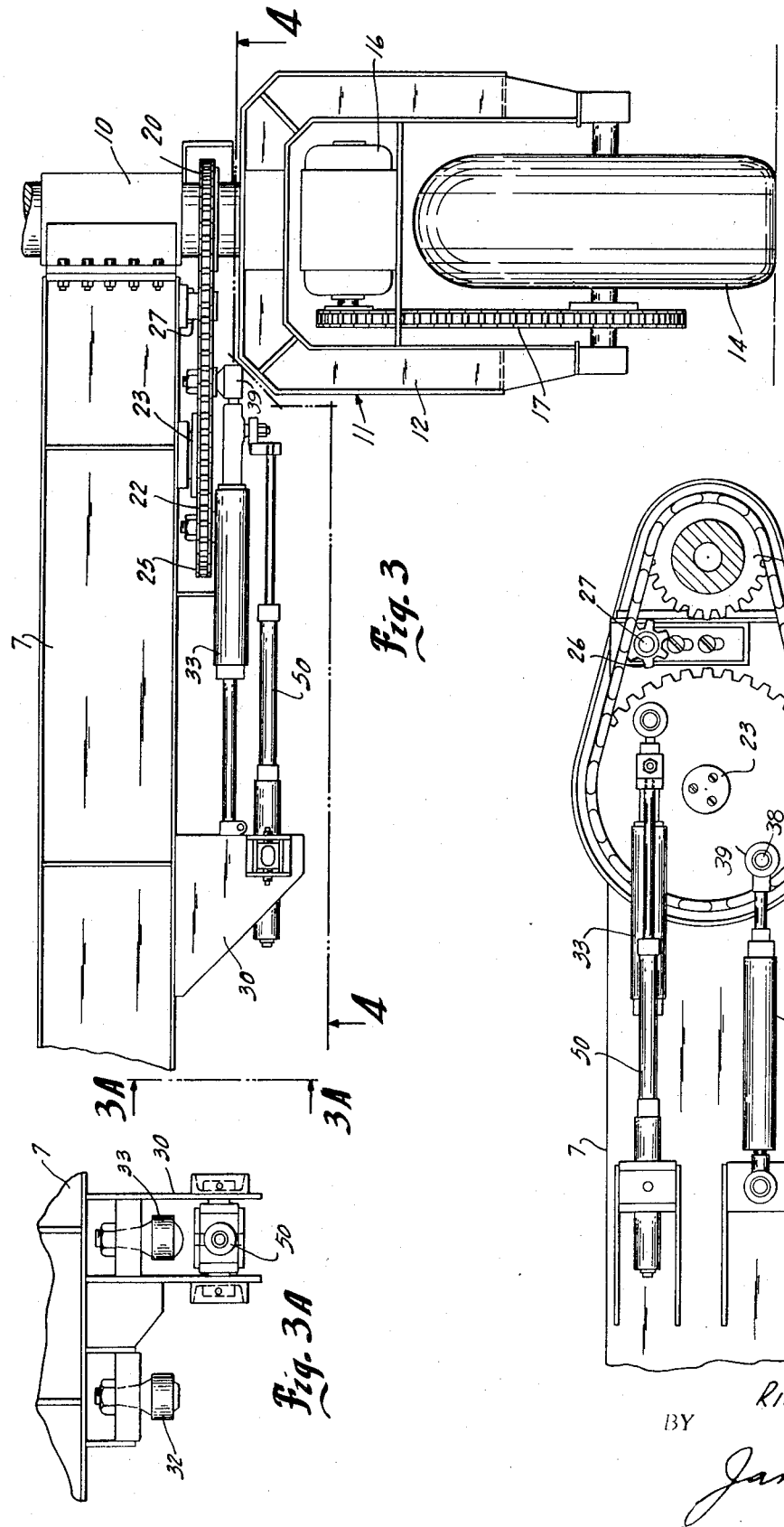

PATENTED OCT 10 1972

INVENTOR.
RICHARD O. GORDON
BY
James E. Nilles
ATTORNEY

INVENTOR.
RICHARD O. GORDON

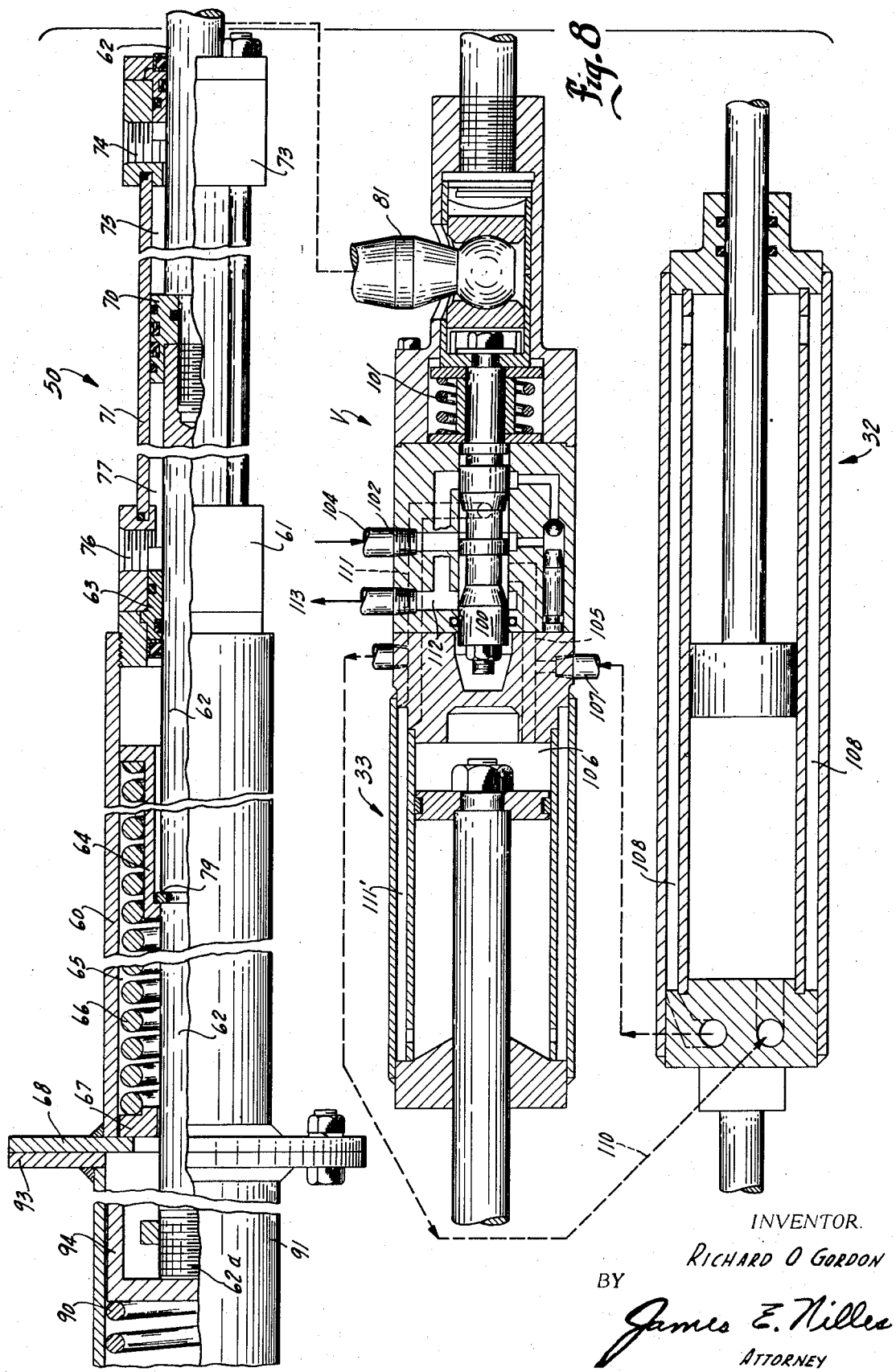

VEHICLE STEERING SYSTEM OF THE FLUID POWER TYPE AND SPRING CENTERED, SPRING MODULATED CONTROL CYLINDER THEREFOR

BACKGROUND OF THE INVENTION

The present invention pertains to vehicle steering apparatus of the fluid power type.

An example of the prior art of this general type of steering apparatus is shown in the U.S. Pat. No. 3,148,744, which issued Sept. 15, 1964 to DeStasi, entitled, "Vehicle Steering System and Including Compensating Steering Linkage." The apparatus shown in that patent utilized a rather complicated linkage arrangement as the means for simultaneously actuating servo valves to different extents, to thereby cause their associated power cylinders to be actuated in different amounts, to thereby produce angular rotation of the steerable wheels. That prior art apparatus, as does the present apparatus, insures that the two wheels being steered are turned in different angular amounts to thereby prevent scuffing or skidding of the tires. That is to say, the apparatus causes the wheel at the inside of the turn to be angularly moved to a greater extent than the outer wheel, thereby providing that the center lines of all of the wheel axles meet at a common point, and which common point may shift with changes in the steering angle.

Other conventional methods of steering a pair of wheels simultaneously have included the use of a mechanical tie bar or drag link assembly orientated in the correct position to compensate for the difference of angular movement of the wheels, thereby causing the vehicle to effect a turn without slipping or scuffing of the tires. These prior art devices however, are not usable with certain types of vehicles, such as with gantry cranes or the like wherein the space between the wheels must be kept clear for the carrying of the article being transported.

SUMMARY OF THE INVENTION

The present invention provides a steering system for a vehicle of the type having at least two steerable wheels, and which steering system utilizes a pair of fluid power cylinders for each of the two wheels being steered. The system includes a spring centered control cylinder having a first spring for returning the cylinder to neutral and also has a modulating spring so that the control cylinder does not retract at the same rate at which it extends. Such a control cylinder is provided for actuating the fluid valve of one of the power cylinders of each of the steering wheels. Consequently, when the vehicle is turned in one direction, that control cylinder located at the inside of the turn extends and is not influenced by the said modulating spring, while the control cylinder located in connection with the wheel at the outside of the turn, is contracted and due to its modulating spring is not contracted at the same rate at which the opposite control cylinder is extended. Thus, the outer wheel is turned to a lesser degree than the inner wheel.

The resulting control system is a fully hydraulic system which utilizes no compensating connecting linkages between the servo valve and the operator control. The present steering apparatus furthermore utilizes no tie bar and drag link assembly, push-pull cables or other extra components as are found in other prior art types of steering systems.

Another aspect of the present invention provides an improved control cylinder which is spring centered and which also has a modulating spring for providing that the control cylinder contracts at a different, slower rate than it extends. Thereby the control cylinders act to admit fluid to their respective power cylinders at different rates, depending on whether they are being contracted or extended, as in a situation where they are used for steering a pair of wheels.

These and other objects and advantages of the present invention will appear hereinafter as this disclosure progresses, reference being had to the accompanying drawings.

BRIEF DESCRIPTION OF THE DRAWINGS

FIG. 1 is a side elevational view of a gantry crane embodying the present invention;

FIG. 2 is a front elevational view of the gantry crane shown in FIG. 1;

FIG. 3 is an enlarged, fragmentary view of a portion of the steering mechanism as shown in FIG. 1, certain parts being shown as broken away or in section for clarity;

FIG. 3a is a view taken generally along the line 3a—3a in FIG. 3;

FIG. 4 is a bottom view of the mechanism shown in FIG. 3, certain parts being shown as broken away or in section for the sake of clarity;

FIG. 8 is a further enlarged view showing the control cylinder and the two power cylinders for one wheel assembly.

DESCRIPTION OF A PREFERRED EMBODIMENT

Figure 5:
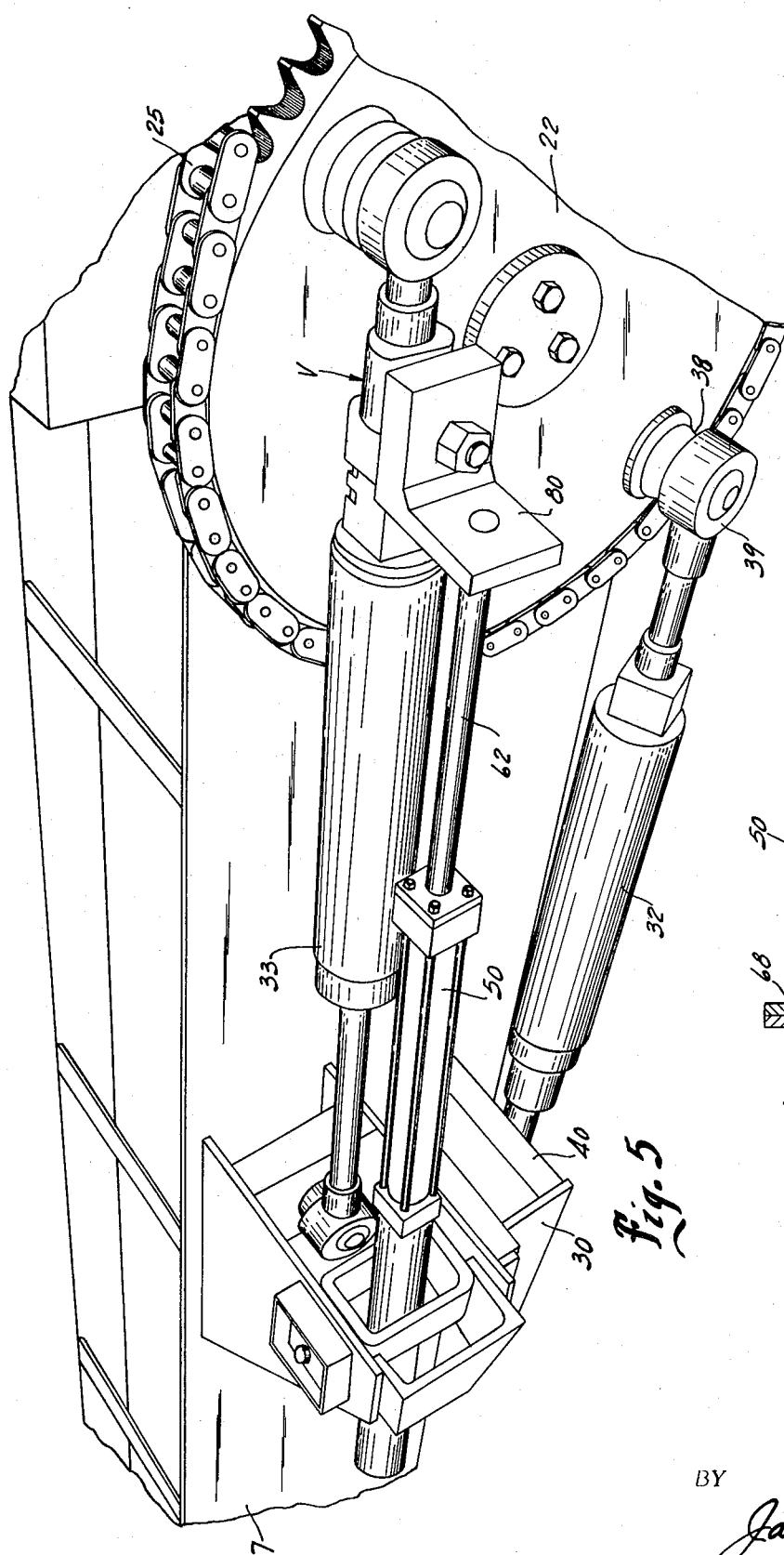
FIG. 5 is a perspective view of the device shown in FIG. 3, the view being taken generally from beneath the device.

The invention has been shown and described as applied to a mobile gantry crane C, although other types of cranes such as straddle cranes or the like are particularly suited for the present invention. If a more detailed description of the particular gantry crane C shown is deemed to be either necessary or desirable, reference may be had to the U.S. Pat. No. 3,247,975, which issued Apr. 26, 1966 to Holt et al. and entitled "Mobile Gantry Crane having a Resiliently Supported Bridge." It is believed sufficient to say for purposes of the present disclosure that the crane shown includes an upper, generally horizontal, transverse girder 1 having a pair of downwardly diverging legs 2 and 3 at one end and another pair of downwardly converging legs 4 and 5 at the other end of the girder. A longitudinally extending sill 7 connects the lower ends of the legs 2 and 3, while another parallel sill 8 connects the lower ends of legs 4 and 5.

When viewed in FIG. 2, it will be noticed that the entire expanse between the pair of legs 2, 3 and the pairs of legs 4, 5 is open and unobstructed so that a load (not shown) may be suspended from the transverse girder 1 and between the opposite pairs of legs.

At each end of each sill is a vertical bearing 10 which journals its respective steering wheel spindle 11. The lower end of each spindle 11 has a bifurcated end in the form of a yoke 12 fixed thereto and for rotation therewith. A ground wheel 14 is rotatable in the lower end of each yoke and an individual power plant in the form of an electric motor 16 is supported within the yoke for driving its wheel through a chain connection 17. In this manner, each of the wheels is individually driven by its own power plant. Each of the wheels is also rotatable on its vertical spindle and therefore, each of the wheels is individually steerable. While the invention has been shown as applied to the crane for steering of all four wheels, it will be understood that only two wheels at one end of the vehicle may be steerable.

As shown clearly in FIGS. 3 and 4, each of the steering spindles also has a sprocket 20 rigidly fixed therewith. A steering sprocket 22 is also journalled adjacent each of the sprockets 20 by means of the stub shaft 23 which is fixed to the lower side of the sills 7 and 8. A roller chain 25 is then trained around the steering sprocket 22 and around the spindle sprocket 20, and a tension adjusting sprocket 26 is also adjustably mounted on its shaft 27 on the sill for adjusting the tension of the chain.

As the construction of each of the steering assemblies to be described is the same for each of the wheels, only one will now be generally described.

Figure 7:
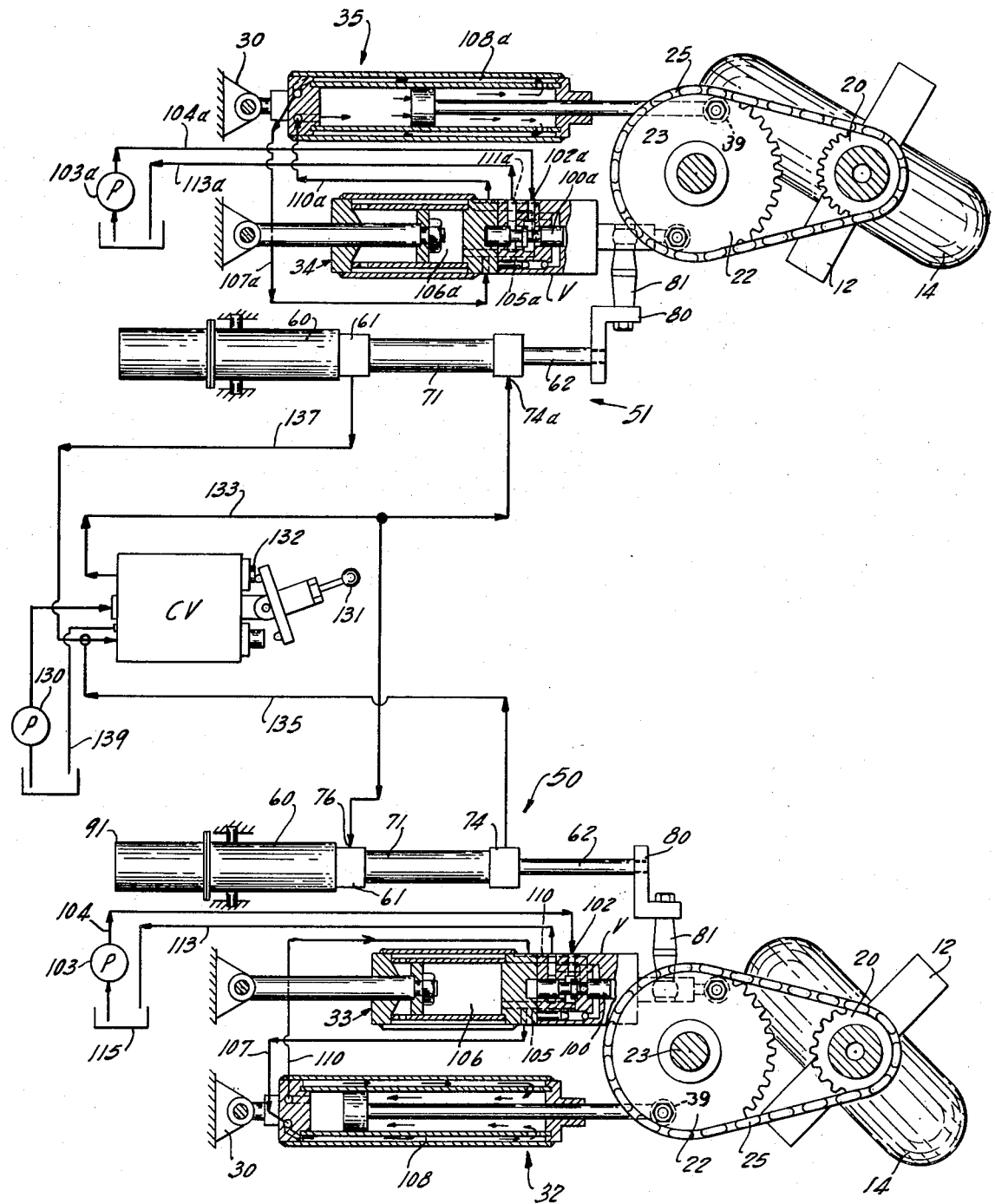
FIG. 7 is a schematic view depicting the control system of the present invention as applied to two steerable wheels of the gantry crane, as shown in FIGS. 1 and 2.

As shown clearly in FIG. 7, a pair of hydraulic power cylinders is provided between each of the steering sprockets 22 and brackets 30 fixed to the lower side of the sills. More specifically, cylinders 32, 33 are provided for one of the steering sprockets. Cylinders 34, 35 are provided for the adjacent sprocket at the corresponding end of the crane. The invention will be described in connection with the power cylinders 32 to 35 which are located at one end of the crane and are operated together to effect turning movement at that end of the crane.

As previously stated however, the power cylinders and the steering arrangement at the opposite end of the crane would be similar so that all four wheels of this particular embodiment of the invention can be steered simultaneously. In this manner, a very short turning radius can be obtained, in fact the gantry crane can be turned practically about its own vertical axis.

The connection of the power cylinders to their respective steering sprockets 22 is in the form of a conventional ball stud 38 and a complementary socket 39. The other end of the power cylinders are connected to the brackets 30 of the frame by means of the pivotal block 40.

One of the power cylinders of each of the sprockets has a power cylinder valve V attached thereto and in fluid communication with its opposite ends so that actuation of the valve V causes pressure fluid to be admitted selectively to either end of the power cylinder. This valve V is actuated, in accordance with the present invention, by the control cylinder 50 now to be described. A similar control cylinder 51 is provided for the other sprocket adjacent that particular end of the gantry, but as the valves V and the control cylinders are all similar in construction, only one control cylinder 50 will be described.

Figure 6:
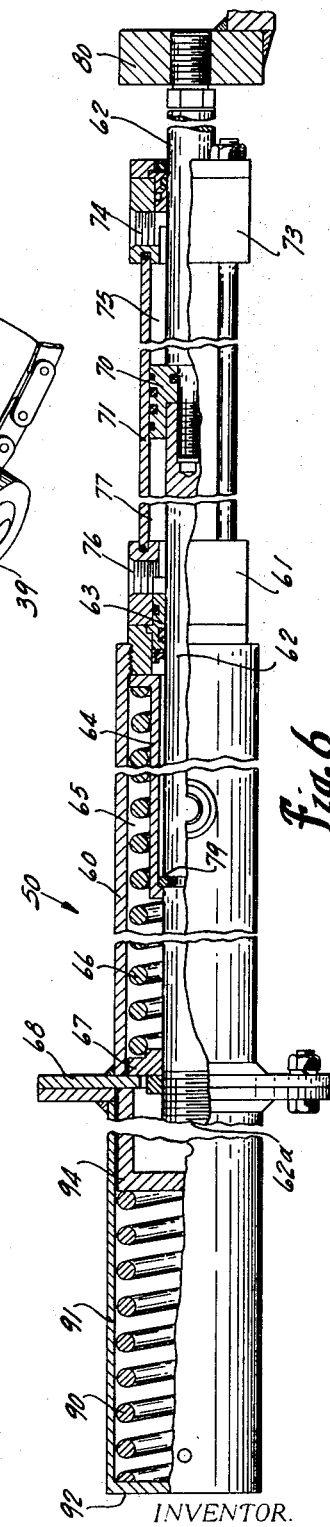
FIG. 6 is a cross sectional view of the control cylinder shown in the other figures, certain parts shown as broken away.

The control cylinder 50 is shown in section in FIGS. 6 and 8, and includes a cylinder barrel 60 to which the rod end head 61 is secured. A piston rod 62 is slideable in the rear rod bushing 63 fixed in the head 61. Suitable O-ring and wiper seals are provided as indicated. An internal spring retainer 64 is mounted in the annular chamber 65 formed between the barrel 60 and the rod 62 and a centering spring 66 acts against a spring retainer 67 abutting against an end flange 68, and also acts against the retainer 64 which abuts against the inner end of the rod head 61.

A piston 70 is fixed to the piston rod 62 and sealingly slides within a cylinder barrel 71 which is also fixed to the head 61. At the other end of the cylinder barrel 71 is fixed a head 73 which contains a fluid passage 74 through which fluid can be introduced to and expelled from annular chamber 75 located at one side of the piston 70. Another fluid passage 76 is provided in head 61 and functions to convey fluid to and expel fluid from the opposite working chamber 77 located at the other side of the piston 70.

Admission of fluid through passage 76 into chamber 77 causes extension of the piston rod 62. When fluid pressure is admitted through passage 74, the piston 70 and its attached rod 62 are urged into the contracting direction. The retaining ring 79 fixed on the piston rod 62 picks up the internal retainer 64 as the control cylinder is being contracted thereby compressing the spring 66. Spring 66 thus acts to return the piston 70 to center after pressure has been relieved from the chamber 75. Thus, the control cylinder 50 is spring centered by means of the spring 66.

Thus extension and contraction of the control cylinder provides a two-way, power operated control cylinder.

The rod 62 is connected by adapter 80 to the control rod 81 of the valve V.

In order to provide that the control cylinder does not retract at the same rate at which it extends, a second spring 90, which provides linear spring response, is located in a spring barrel 91 having an end cap 92, and which barrel is rigidly fixed at its other end by its plate 93 to the plate 68 of the cylinder barrel 60. A spring retainer 94 is slideable within barrel 91 and spring 90 acts between retainer 94 and end plate 92, thus continually urging the retainer 94 towards the piston rod 62. The inner end 62a of the piston rod 62 is adapted to abut against the retainer 94, when the control cylinder is contracted beyond a predetermined point. Further contraction of the control cylinder beyond this predetermined point acts to cause the piston rod to compress the spring 90, thereby impeding and retarding continued contraction of the rod. Consequently, the reduced amount of movement of the piston 62 in the contracting direction results in less fluid pressure being admitted through valve V to its attached power cylinder 33.

As shown in FIG. 7, when the operator desires to turn the vehicle to the left, the wheel on the left side should be turned to a greater angle than the wheel at the outer side of the turn. This differential turning of the wheels insures that no scuffing or skidding of the tires occurs as the turn is being made. Thus when making a turn as indicated in FIG. 7, the control cylinder 50 is being extended while the control cylinder 51 at the inside of the turn is being contracted. Consequently, due to the resistance offered by spring 90 in the control cylinder 51, the piston rod 62 and its adapter 80 move valve V a lesser distance to thereby admit a lesser amount of fluid to the power cylinder 34. On the other hand, extension of the control cylinder 50 is not influenced by its spring 90 and therefore when cylinder 50 is extended, the valve V of power cylinder 33 is operated normally and a normal amount of pressure fluid is admitted to the power cylinder 33 to enable it to extend in its normal manner. Consequently, the wheel of the gantry at the inside of the turn is operated through a greater angular movement than the wheel at the outer side of the turn.

In this manner, the oppositely acting control cylinders 50 and 51 supply different quantities of pressure fluid to their respective power cylinders 33 and 34, respectively, thereby producing angular rotation of their steerable wheels in like direction, but in different magnitudes. No complicated linkages nor mechanical tie bars or drag links are necessary to produce this differential turning of the steerable wheels.

A more detailed reference will now be made to the power cylinder 33 and its valve V as well as to the fluid power circuit shown in FIGS. 7 and 8.

The valve V includes a valve spool 100 which is connected to the control rod 81 of the valve. A spring 101 acts to urge the valve spool 100 to the neutral position. When the valve spool is shifted to the left as viewed in FIG. 8, fluid pressure enters the fluid inlet port 102 from the pump 103 and conduit 104. This fluid is then directed via passage 111 in the valve body and to the rod end chamber of the power cylinder 33. This causes contraction of the power cylinder 33. Fluid is also directed via flexible conduits 110 to the head end of the other power cylinder 32 extending the power cylinder. The fluid is expelled from rod end of cylinder 32 via passage 108 in side wall of the power cylinder 32 through flexible conduit 107, through passage 112 in the valve and then through conduit 113 to sump.

Shifting of the valve spool 100 in the opposite direction by the control cylinder 50 (that is to the right as viewed in FIG. 7) acts in the opposite manner, that is to say, pressure fluid then flows from the pump 103, through the inlet 102 and is directed to the passage 105 to pressurize the head end of cylinder 33. This pressure fluid also flows via conduit 107 to the rod end of the other power cylinder 32, thereby contracting the latter while the power cylinder 33 extends.

The arrangement for the other wheel assembly is similar and corresponding parts have been labeled with the same reference numeral and also the suffix letter *a*. Thus each wheel assembly has its separate fluid pumps which furnish pressure fluid to the power cylinders.

As shown in FIG. 7, a common fluid pressure pump 130 furnishes pressure fluid to a control valve CV. When the lever 131 of the control valve CV is swung as indicated, the plunger 132 of the control valve acts to permit pressure fluid to flow from the pump 130 to line 133 and to the port 76 of control cylinder 50 and port 74a of control cylinder 51. Under those conditions, fluid pressure is exhausted from the opposite ends of control cylinder 50 via line 135 and from the opposite end of control cylinder 51 via line 137. The control valve CV itself is dumped to the sump via line 139.

The control valve itself is of the type shown in my copending U.S. application, Ser. No. 874,443, filed Nov. 6, 1969, now U.S. Pat. No. 3,605,814 and entitled "Improved Pressure Regulating Valve" and if a more detailed description of that valve is deemed to be either necessary or desirable, reference may be had to said application.

With the vehicle as described, a separate power steering pump is provided for each wheel, and consequently each wheel is powered steered by fluid independently of the other wheel.

Control cylinders move only the servo-valves, and the actual force to turn the wheels is accomplished by the power cylinders.

In connection with the control cylinders, they are spring loaded to the neutral position, and consequently as control cylinders return to neutral, the control valve is returned to neutral. In other words, the centering springs return the control cylinders to the neutral position, thereby turning the crane ground wheels back to a straight ahead position, thereby providing automatic return of the ground wheels to the straight ahead position, and this is accomplished hydraulically, and not as in other types of vehicles by the arrangement of the inclination of the kingpin pivot point mechanism.

The spring centered control cylinders, are modulated by additional springs to keep the power steered ground wheels in proper relation either in a straight ahead position or to full turn in either direction when the same fluid pressure is applied simultaneously to each control cylinder by the operator.

I claim:

1. In a vehicle of the type having a frame and at least a pair of spaced apart steerable wheel assemblies and each assembly including a yoke pivotally mounted in said frame and a ground wheel rotatably mounted in each of said yokes, apparatus for angularly rotating each of said yokes to effect steering of said vehicle, each of said apparatus comprising, a double acting fluid power cylinder mounted on said frame and having a connection with its respective yoke for rotating the latter in either direction and to an extent determined by the amount of extension and contraction of said power cylinders, each of said power cylinders having servo-valve means for determining the amount of fluid admitted to its power cylinder and the direction of fluid through said cylinders, and an extensible control cylinder connected with each of said servo-valve means for actuation thereof, said control cylinders having resilient means for retarding movement of its control cylinder in one direction to thereby vary the amount of contraction of said control cylinder in respect to its extension, whereby said control cylinders are operated in opposite directions and consequently said servo-valve means are actuated in different amounts to cause said power cylinders to simultaneously produce angular rotation of said yokes in like direction but to different degrees.

2. The vehicle set forth in claim 1 further characterized in that said control cylinder is attached at one end to said frame and is connected at its other end to said servo-valve means.

3. The vehicle set forth in claim 1 including a separate fluid pressure pump for each of said apparatus.

4. The vehicle set forth in claim 1 further characterized in that said connection between each of said power cylinders and its yoke comprises, a sprocket fixed to said yoke, a steering sprocket mounted on said frame and having an endless chain connected with said sprocket on said yoke, and said power cylinder is connected at one end to said steering sprocket.

5. The vehicle set forth in claim 4 further characterized in that said control cylinder is attached at one end to said frame and is connected at its other end to said servo-valve means.

6. The vehicle set forth in claim 1 further characterized in that said control cylinders also have resilient centering means for returning said control cylinders to a neutral position.

7. The vehicle set forth in claim 6 further characterized in that said connection between each of said power cylinders and its yoke comprises, a sprocket fixed to said yoke, a steering sprocket mounted on said frame and having an endless chain connected with said sprocket on said yoke, and said power cylinder is connected at one end to said steering sprocket.

8. The vehicle set forth in claim 7 further characterized in that said control cylinder is attached at one end to said frame and is connected at its other end to said servo-valve means.

* * * * *